Dec. 7, 1943.    C. W. McLAUGHLIN    2,336,113
COTTON DUSTER ATTACHMENT
Filed Aug. 13, 1942    2 Sheets-Sheet 1

INVENTOR.
Charles W. McLaughlin
BY John M. Spellman
ATTORNEY

Dec. 7, 1943.                C. W. McLAUGHLIN                2,336,113
                          COTTON DUSTER ATTACHMENT
                            Filed Aug. 13, 1942              2 Sheets-Sheet 2
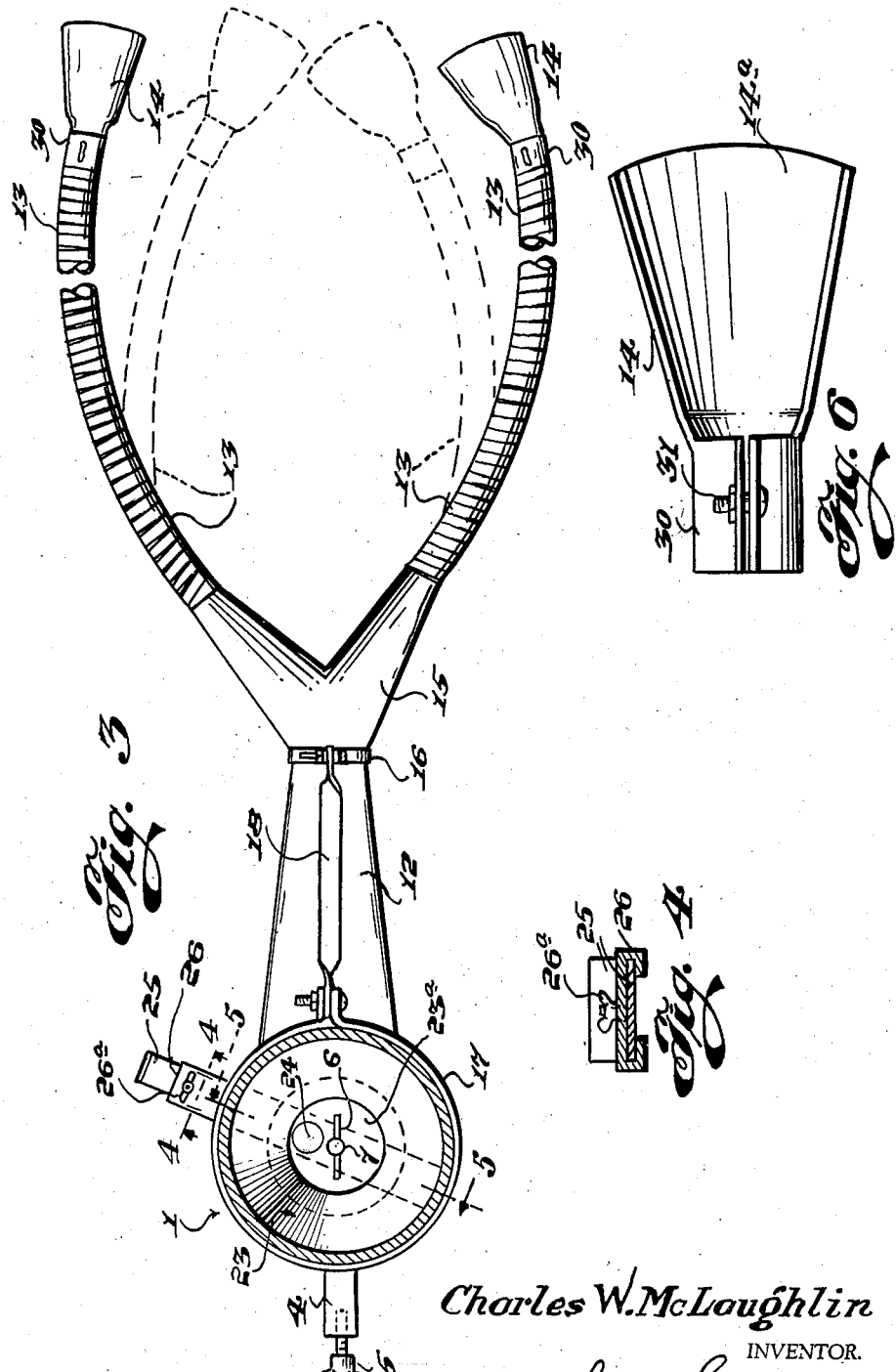
Charles W. McLoughlin
           INVENTOR.
BY John M. Spellman
         ATTORNEY Patented Dec. 7, 1943

2,336,113

UNITED STATES PATENT OFFICE 2,336,113

COTTON DUSTER ATTACHMENT

Charles W. McLaughlin, Italy, Tex.

Application August 13, 1942, Serial No. 454,708

2 Claims. (Cl. 43—148)

This invention relates to machines and devices for treating growing plants and crops to destroy injurious insects, commonly known as a "duster," and in such connection it relates more specifically to the novel construction and operation thereof.

The primary object of the invention is to provide a device of this character which is simple in construction and operation but which is positive and certain in spreading and dusting the powder on the plants.

Another object of the invention is to provide a device of this sort which may be attached to a tractor cultivator or to a trailer agricultural implement and operated by the tractor electric battery or other battery carried on the trailer.

The invention also includes instrumentalities designed to carry out the purpose intended, that of dusting the plants while cultivating them, toward which end the device has flexible arms with spreader nozzles, an agitator to keep the powder in proper flowing condition, an adjustable feeder means, motor, and means for fastening the device in single or multiple form to the machine on which used.

With the above and other minor objects in view, the invention will be clearly understood from a perusal of the following detailed description, taken in connection with the accompanying drawings, and in the drawings:

Figure 4 is a detail sectional view of the feeder means, taken on the line 4—4 of Figure 3;

Figure 5 is a transverse vertical sectional view of Figure 3, the view being had on the line 5—5 thereof; and Figure 6 is an enlarged detail view of one of the spreader nozzles.

Figure 1:
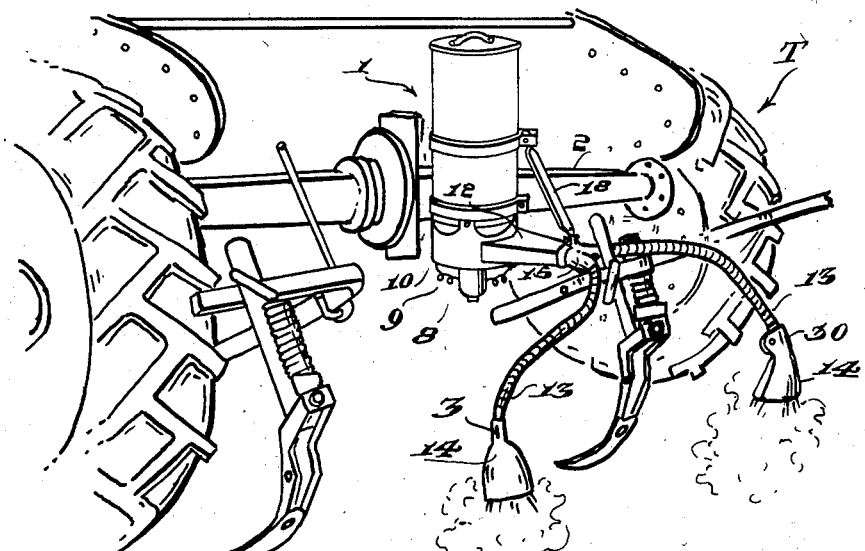
Figure 1 is a perspective view in part of a farm tractor, and illustrating one mode of fastening the duster in position thereon.

In carrying out the invention, there is provided a hopper body or casing generally designated by the numeral 1, the hopper being fastened to the rear axle housing 2 of the tractor T by a bracket or clamp 3 by securing the arms 4 of the bracket to the axle housing by the set screws 5, in the application of one only of the units or dusters to two rows of plants.

Figures 2, 3:
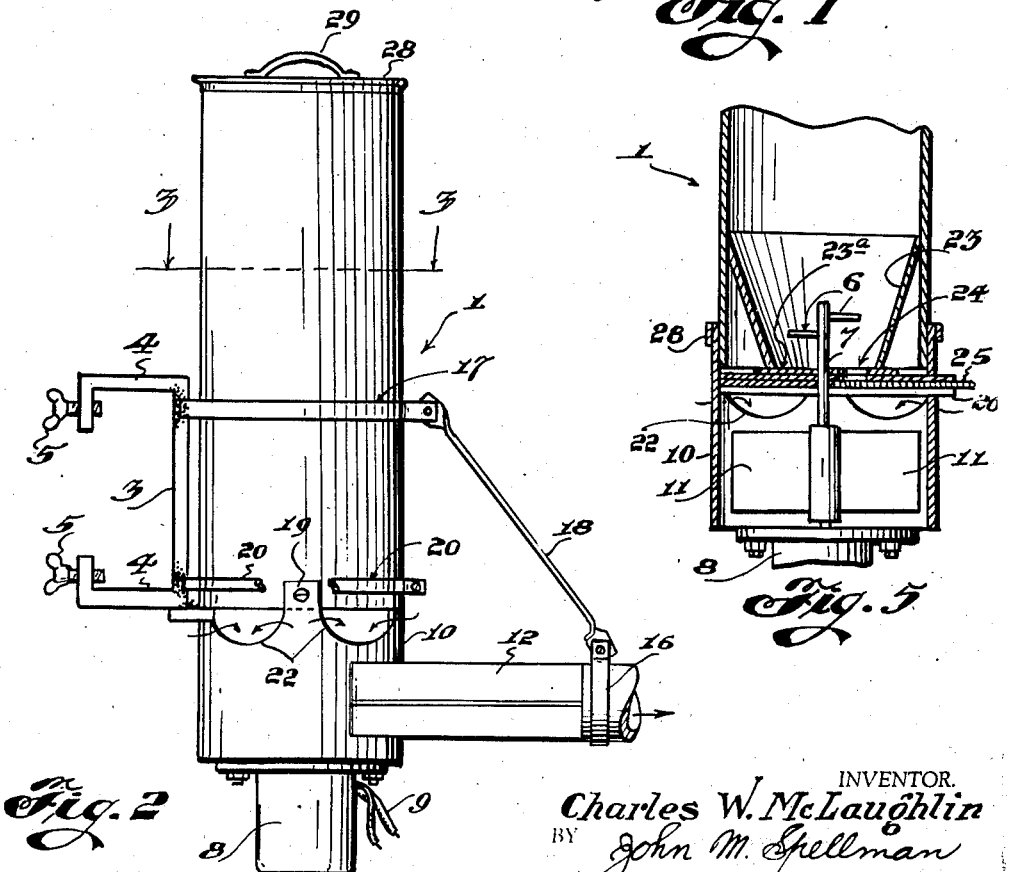
Figure 2 is a side elevational view of the duster removed from the tractor and partly broken away.
Figure 3 is a cross sectional view on the line 3—3 of Figure 2, in broken formation, showing the flexible arms and spreader nozzles.

Referring to Figures 3, 4 and 5, the hopper is to be filled with insect-destroying powder of preferred type, the powder being kept in an agitated condition by an agitating means 6 secured to the motor shaft 7, propelled by a small battery operated motor 8 through the wires 9, an automobile battery of the storage type of 6 volts being sufficient.

The lower end of the body or hopper has secured thereto a housing or sleeve 10 to which the motor 8 is attached and inside the housing 10 and mounted on the motor shaft 7 are blower blades 11 which operate under action of the motor to force the powder out through a delivery conduit 12 to which are secured the flexible arms 13, having the spreader nozzles 14. The force of the blast created by the motor and the blades causes the powder to diverge at the point of a forked head piece 15 to which the flexible arms 13 are fastened by soldering, welding or otherwise. On the forward motion of the tractor the powder tends to flow against the flared spreaders and the blasting force is sufficient to thoroughly treat or spread the powder onto the plants.

The conduit 12 with the forked head piece 15 may also be soldered or welded to the connecting ends of the arms 13 or made integral therewith, and at this point of juncture there is provided a band or clamp 16 as a means for supporting the forked head and the arms. A band or clamp 17 is also fastened around the hopper body and a strap or brace 18 is connected to the bands 16 and 17 to complete the support. The housing 10 is bolted as at 19 to the hopper body 1 and a third band or clamp 20 placed therearound. By this arrangement the bracket 3 is welded to the bands 17 and 20 and a small lug serves as an additional supporting means, the lug being inserted between the lower end of the hopper body and the housing 10 through one of the semicircular openings 22. These openings 22 are for the purpose of admitting air drawn in by the blower blades, as indicated by the arrows.

It will be noted that the lower end of the hopper body 1 is provided with a funnel-shaped member 23, its lower end being closed by a plate 23—a which has a small opening 24. This opening provides a feeding means for the powder to the blower blades in the housing 10, the opening being opened fully or partly opened as desired by means of a plate 25 slidably arranged between the members 26, fastened to the lower surface of the plate 23—a. A set screw 26—a holds the plate 25 in adjusted position. The hopper includes a cover 28 with handle 29. The spreader nozzles 14 may be soldered to the arms 13 and further made secure by the cuffs 30 by tightening the bolts 31.

From the foregoing it will now be apparent that the powder may be freely applied to the plants as the tractor travels along the rows of plants and that the arms 13 may be set in the desired position owing to their flexible nature. The revolutions of the blower blades draw in the air, the agitator keeps the powder stirred up for proper feeding. The suction inwardly of the air creates a partial vacuum between the agitator and the blades, which serves to draw the powder into the conduit head and thence into the arms 13.

While the device is mainly intended for use at the rear of a tractor, it may be fastened to the front part thereof where the operator may see more clearly its operation as the plants are being treated.

It will be understood that while the disclosure presents a practical working embodiment of the invention, simple in construction and operation, it is capable of some modification and alteration within the spirit of the inventive thought and such as would be within the scope and meaning of the claims appended hereto.

What is claimed is:

1. A unit duster adapted to be readily detachably secured to a portion of the frame of an agricultural vehicle comprising a casing having a lower open end, a sleeve surrounding the lower end of the casing, a slide valve adjacent the upper end of the sleeve and constituting a bottom for the casing, a funnel having its upper edge closely engaging the inner wall of the casing and its lower edge supported on the slide valve, a fan within the sleeve and having a shaft extending through the valve into the funnel, agitators on the shaft, a motor secured to the lower end of the sleeve and adapted to actuate the shaft, a conduit extending laterally from the sleeve and in communication with that portion thereof in the plane of the fan, said sleeve having substantially semi-circular openings in the wall thereof, adjacent portions of which merge to form upwardly extending supports, means for securing the supports to the casing, a vertical clamp having means adapted for securing the clamp to the frame of the vehicle, spaced horizontal clamping members attached to the clamp and surrounding the casing, one of the clamping members being positioned in engagement with the upper portions of the sleeve forming the openings and a supporting brace secured to the conduit at a substantial distance from the sleeve for maintaining the conduit in rigid relation to the sleeve, said conduit having connections to one or more nozzles.

2. A unit duster adapted to be readily detachably secured to the rear axle of a tractor comprising a casing having a lower open end, a sleeve surrounding the lower end of the casing, a slide valve adjacent the upper end of the sleeve and constituting a bottom for the casing, a funnel having its upper edge closely engaging the inner wall of the casing and its lower edge supported on the slide valve, a fan within the sleeve and having a shaft extending through the valve into the funnel, agitators on the shaft, a motor secured to the lower end of the sleeve and adapted to actuate the shaft, a conduit extending laterally from the sleeve and in communication with that portion thereof in the plane of the fan, said sleeve having substantially semi-circular openings in the wall thereof, adjacent portions of which merge to form upwardly extending supports, means for securing the supports to the casing, a vertical clamp having means adapted for securing the clamp to the rear axle of a tractor, spaced horizontal clamping members attached to the clamp and surrounding the casing, one of the clamping members being positioned in engagement with the upper portions of the sleeve forming the openings and a brace secured to the other clamping member and the conduit for maintaining the conduit in rigid relation to the sleeve, said conduit having connections to one or more nozzles.

CHARLES W. McLAUGHLIN.